United States Patent
Su et al.

(10) Patent No.: US 10,144,125 B2
(45) Date of Patent: Dec. 4, 2018

(54) CONTROL DEVICE OF ROBOT ARM AND TEACHING SYSTEM AND METHOD USING THE SAME

(71) Applicant: INDUSTRIAL TECHNOLOGY RESEARCH INSTITUTE, Hsinchu (TW)

(72) Inventors: Jui-Yiao Su, New Taipei (TW); Yan-Chen Liu, Taipei (TW); Ching-Shun Chen, Changhua County (TW); Chang-Yi Chen, Hsinchu (TW); Cheng-Li Wu, New Taipei (TW); Hung-Hsiu Yu, Changhua (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 183 days.

(21) Appl. No.: 15/392,251

(22) Filed: Dec. 28, 2016

(65) Prior Publication Data
US 2018/0043525 A1    Feb. 15, 2018

Related U.S. Application Data

(60) Provisional application No. 62/374,074, filed on Aug. 12, 2016.

(30) Foreign Application Priority Data

Nov. 17, 2016   (TW) .............................. 105137642 A

(51) Int. Cl.
*G05B 15/00*    (2006.01)
*G05B 19/00*    (2006.01)
(Continued)

(52) U.S. Cl.
CPC ........... *B25J 9/0081* (2013.01); *B25J 13/081* (2013.01); *G05B 19/423* (2013.01);
(Continued)

(58) Field of Classification Search
CPC ..... B25J 13/081; B25J 9/0081; G05B 19/423; G05B 19/425; G05B 2219/36417; G05B 2219/36433; G05B 2219/39548
See application file for complete search history.

(56) References Cited

U.S. PATENT DOCUMENTS 4,506,448 A * 3/1985 Topping ................... B25J 15/00
                                                            33/520
4,640,137 A * 2/1987 Trull ....................... G01L 5/228
                                                            338/114
(Continued)

FOREIGN PATENT DOCUMENTS

CN    103223675 A    7/2013
CN    103347662 A   10/2013
(Continued)

OTHER PUBLICATIONS

Sang Choi, et al; "Lead-Through Robot Teaching"; IEEE; Apr. 22-23, 2013; #978-1-4673-6225-2; 4 pgs.
(Continued)

*Primary Examiner* — Khoi H Tran
*Assistant Examiner* — Jorge O Peche
(74) *Attorney, Agent, or Firm* — Mueny, Geissler, Olds & Lowe, PC

(57) ABSTRACT

A control device of robot arm including a pressure sensing module and a control module is provided. The pressure sensing module, disposed on an operating portion of a robot arm, has a touch-sensing surface for detecting an operation command applied to the touch-sensing surface. The control module receives at least a pressure sensing signal outputted (Continued)

by the pressure sensing module and outputs a motor driving signal to the robot arm in response to the operation command. The touch-sensing surface includes a first touch-sensing region and a second touch-sensing region. The first touch-sensing region is for defining a first reference coordinate system satisfying a translational motion mode. The second touch-sensing region is for defining a second reference coordinate system satisfying a rotational motion mode. The control module controls the robot arm according to the operation command.

21 Claims, 6 Drawing Sheets

(51) Int. Cl.
B25J 9/00 (2006.01)
B25J 13/08 (2006.01)
G05B 19/423 (2006.01)
G05B 19/425 (2006.01)

(52) U.S. Cl.
CPC .. *G05B 19/425* (2013.01); *G05B 2219/36417* (2013.01); *G05B 2219/36433* (2013.01); *G05B 2219/39548* (2013.01)

(56) References Cited

U.S. PATENT DOCUMENTS

| | | | |
|---|---|---|---|
| 5,010,774 A | 4/1991 | Kikuo et al. | |
| 5,373,747 A * | 12/1994 | Ogawa | B25J 13/084 73/862.041 |
| 6,212,443 B1 | 4/2001 | Nagata et al. | |
| 6,285,920 B1 * | 9/2001 | McGee | G05B 19/423 219/125.11 |
| 6,385,508 B1 | 5/2002 | McGee et al. | |
| 7,658,119 B2 * | 2/2010 | Loeb | B25J 13/084 73/862.046 |
| 7,984,658 B2 | 7/2011 | Kishida et al. | |
| 8,490,501 B2 | 7/2013 | Koyama et al. | |
| 9,199,375 B2 | 12/2015 | Miyoshi | |
| 9,233,473 B2 | 1/2016 | Sandini et al. | |
| 9,677,952 B2 * | 6/2017 | Bao | H01L 29/84 |
| 2001/0047246 A1 | 11/2001 | Fullen et al. | |
| 2004/0078114 A1 * | 4/2004 | Cordell | B25J 9/1692 700/258 |
| 2006/0254369 A1 * | 11/2006 | Yoon | A61B 5/6804 73/862.041 |
| 2009/0133508 A1 * | 5/2009 | Johansson | B25J 13/084 73/862.046 |
| 2010/0050784 A1 | 3/2010 | Joung | |
| 2011/0071664 A1 * | 3/2011 | Linn | B25J 9/0006 700/213 |
| 2012/0031886 A1 * | 2/2012 | Hara | B23K 9/095 219/137 R |
| 2012/0130541 A1 * | 5/2012 | Szalek | B25J 9/106 700/258 |
| 2014/0088764 A1 * | 3/2014 | Naidu | H03K 17/962 700/258 |
| 2014/0130593 A1 | 5/2014 | Ciou et al. | |
| 2014/0324218 A1 | 10/2014 | Suzuki | |
| 2015/0019013 A1 * | 1/2015 | Rose | G01L 1/16 700/258 |
| 2016/0033343 A1 * | 2/2016 | Park | G01L 1/205 73/862.046 |
| 2016/0097688 A1 | 4/2016 | Chen et al. | |
| 2016/0258829 A1 * | 9/2016 | Celik-Butler | H01L 41/37 |
| 2017/0051764 A1 * | 2/2017 | Rose | B25J 9/046 |

FOREIGN PATENT DOCUMENTS

| | | |
|---|---|---|
| CN | 103495981 A | 1/2014 |
| CN | 103170973 B | 3/2015 |
| CN | 104428107 A | 3/2015 |
| CN | 104602868 A | 5/2015 |
| CN | 104771118 A | 7/2015 |
| DE | 19943318 A1 | 3/2001 |
| JP | H11231925 | 8/1999 |
| TW | 200414987 A | 8/2004 |
| TW | 201224418 A | 6/2012 |
| TW | M483580 U | 8/2014 |
| WO | WO 2010088959 A1 | 8/2010 |

OTHER PUBLICATIONS

Chengjie LV, et al.;"An Adaptive Compliance Position Control Based on EKF for Series Elastic Actuation"; Proceeding of the 11th World Congress on Intelligent Control and Automation; Shenyang, China, Jun. 29-Jul. 4, 2014; 7 pgs.

* cited by examiner

CONTROL DEVICE OF ROBOT ARM AND TEACHING SYSTEM AND METHOD USING THE SAME

This application claims the benefit of U.S. provisional application Ser. No. 62/374,074, filed Aug. 12, 2016 and Taiwan application Serial No. 105137642, filed Nov. 17, 2016, the disclosures of which are incorporated by references herein in its entirety.

TECHNICAL FIELD

The disclosure relates in general to a robot arm, and more particularly to a control device of a robot arm, a teaching system and a method using the same.

BACKGROUND

Traditionally, a robot controller of an industrial robot is provided with servo controllers for controlling the positions of the motors driving the motion of the manipulator. Meanwhile, each joint motor transmits coordinate signals to the robot controller to determine whether the trajectory of the robot arm matches an expectation or not. If the trajectory of the robot arm does not match the expectation, the user normally edit the commands over and over again through programming languages or application programs, and edit the movement path of the robot arm according to the user's commands.. However, such manner is tedious and time consuming, and lacks intuitive programmability. That is, there is no intuitive input interface existing between the robot arm and the user, and conventional programming system does not allow the user to edit the movement path of the robot arm through intuitive operations. These are the current problems that need to be resolved in the design and manufacturing of robot arms.

SUMMARY

The disclosure is directed to a control device of a robot arm, a teaching system and a method using the same allowing the operator to edit the movement path of the robot arm through lead-through and intuitive operation, and therefore achieving intuitive control.

The disclosure is directed to a control device of a robot arm, a teaching system and a method using the same capable of allowing the operator to choose the compliance modes of the robot arm, which includes compliance teaching manually and changing the posture of the robot arm (for rough positioning) and/or position control on the end effector of the robot arm (for precision positioning).

According to one embodiment, a control device of a robot arm is provided. The control device of the robot arm includes a pressure sensing module and a control module is provided. The pressure sensing module is disposed on an operating portion of a robot arm and has a touch-sensing surface for detecting an operation command applied to the touch-sensing surface. The control module receives at least a pressure sensing signal outputted by the pressure sensing module and outputs a motor driving signal to the robot arm in response to the operation command. The touch-sensing surface includes a first touch-sensing region and a second touch-sensing region. The first touch-sensing region is for defining a first reference coordinate system satisfying a translational motion mode, and the second touch-sensing region is for defining a second reference coordinate system satisfying a rotational motion mode. The control module controls the robot arm to move towards a target position according to the operation command.

According to another embodiment, a robot arm teaching system is provided. The robot arm teaching system includes a pressure sensing module and a control module is provided. The pressure sensing module is disposed on an operating portion of a robot arm and has a touch-sensing surface for detecting an operation command applied to the touch-sensing surface. The touch-sensing surface includes a first touch-sensing region and a second touch-sensing region. The first touch-sensing region is for defining a first reference coordinate system satisfying a translational motion mode, and the second touch-sensing region is for defining a second reference coordinate system satisfying a rotational motion mode. The control module is configured to receive at least a pressure sensing signal outputted by the pressure sensing module and to output a motor driving signal to the robot arm in response to the operation command. The control module includes a joint-motor controller, a mode-switching module and a plurality of joint-motor encoders. The joint-motor controller generates a set of motor torque signals for translating or rotating the end effector of the robot arm according to the operation command. The control module controls the robot arm to move towards a target position according to the operation command. The mode-switching module is for switching operating modes of the robot arm, wherein the operating modes of the robot arm include a compliance teaching mode and a touch operating mode. The joint-motor encoders are disposed on the joints of the robot arm, and, under the compliance teaching mode, generate a set of joint angle signals according to the moving trajectory of the robot arm.

According to an alternative embodiment, a method for performing direct teaching on a robot arm is provided. The method includes following steps: performing initialization on a robot arm and outputting a motor driving signal to the robot arm; recording a moving trajectory of the robot arm to obtain the current position and posture of the robot arm; switching operating modes of the robot arm when the moving trajectory of the robot arm deviates from a target position, wherein the operating modes comprise a compliance teaching mode and a touch operating mode. Under the touch operating mode, a position control on an end effector of the robot arm is performed on the robot arm according to an operation command on the touch-sensing regions; performing a joint posture control on the robot arm manually under the compliance teaching mode; correcting the moving trajectory of the robot arm by performing the position control on the end effector of the robot arm, or performing the position control on the end effector of the robot arm firstly and the joint posture control subsequently, or performing the joint posture control on the robot arm firstly and the position control on the end effector subsequently; terminating recording the moving trajectory of the robot arm; and reproducing a teaching trajectory of the robot arm to move the robot arm to the target position.

The above and other aspects of the disclosure will become better understood with regard to the following detailed description of the embodiment(s). The following description is made with reference to the accompanying drawings.

DETAILED DESCRIPTION

The present disclosure is described with a number of embodiments.

However, the embodiments are for exemplification purpose only, not for limiting the scope of protection of the present disclosure.

Figure 1:
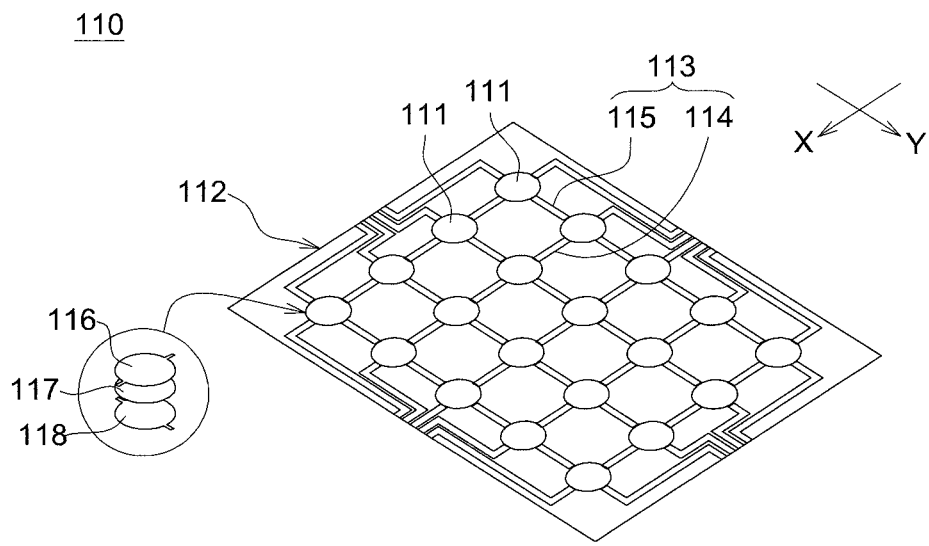
FIG. 1 is a schematic diagram of a pressure sensing module applied in a control device of a robot arm of the disclosure.
Figure 2:
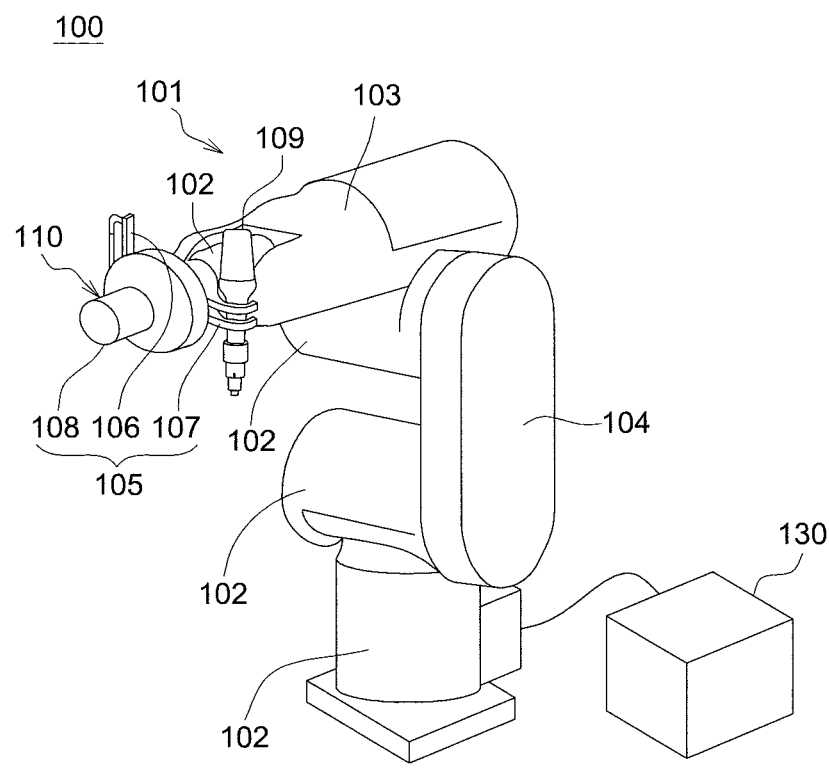
FIG. 2 is a schematic diagram of a robot arm with direct teaching function.
Figure 3A:
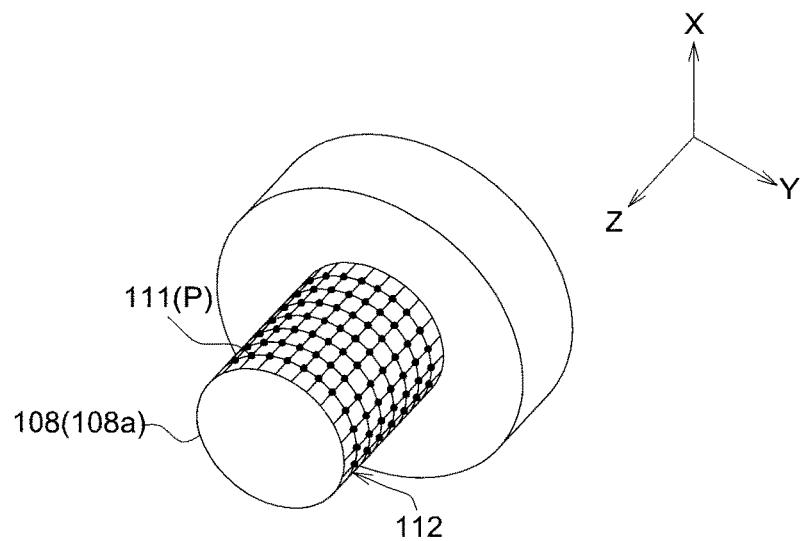
FIGS. 3A and 3B respectively are a schematic diagram and an explosion diagram of a pressure sensing module disposed on an end effector of a robot arm.

Refer to FIGS. 1 and 2. The control device 100 of a robot arm 101 according to an embodiment of the disclosure includes a pressure sensing module 110 and a control module 130. The pressure sensing module 110 is disposed on an operating portion 105 of a robot arm 101 as indicated in FIG. 3A, and has a touch-sensing surface 112 for detecting an operation command applied to the touch-sensing surface 112. Moreover, the control module 130 is configured to receive at least a pressure sensing signal outputted by the pressure sensing module 110 and to output a motor driving signal to the robot arm 101 in response to the operation command.

Refer to FIGS. 1 and 3A. The pressure sensing module 110 includes a plurality of pressure sensing elements interconnected and arranged in the form of an array 111 to form a touch-sensing surface 112. Each pressure sensing element 111 has an upper electrode layer 116, a pressure sensing layer 117 and a lower electrode layer 118. The pressure sensing layer 117 is interposed between the upper electrode layer 116 and the lower electrode layer 118. Each pressure sensing element 111 can be used as a touch point P. When the pressure sensing layer 117 is pressed and conducted between the upper electrode layer 116 and the lower electrode layer 118, the pressure sensing signal can be transmitted to the control module 130 through the array circuit 113 connecting to each pressure sensing element 111 for the control module 130 to determine the coordinate of the touch point P or the touch region where the touch point P is located and drive the robot arm 101 in response to the operation command.

In an embodiment, the array circuit 113 may include a plurality of first wires 114 arranged in parallel along the X-axis direction and a plurality of second wires 115 arranged in parallel along Y-axis direction. Each first wire 114 electrically connects the upper electrode layer 116 of each pressure sensing element 111 arranged in a straight line along the X-axis direction, and each second wire 115 electrically connects the lower electrode layer 118 of each pressure sensing element 111 arranged in a straight line along the Y-axis direction to form a touch-sensing surface 112. The touch-sensing surface 112 formed by using other touch sensing technology or proximity sensing technology can be used in the control device 100 of the disclosure, and the disclosure is not limited thereto.

The pressure sensing module 110 detects whether an object touches the robot arm 101. The object can be such as an operator or a machine operating in collaboration with the robot arm 101. The pressure sensing module 110 can be electro-mechanically integrated with the robot arm 101 and used as a tactile skin of the robot arm 101. Furthermore, the control module 130 can be electrically connected to the pressure sensing module 110 through the signal line inside the robot arm 101 or can wirelessly receive the signal outputted by the pressure sensing module 110.

For example, when the operator touches the pressure sensing module 110 with his/her finger(s), the pressure sensing module 110 generates a pressure sensing signal according to an operation command applied to the touch-sensing surface 112. The control module 130 converts the pressure sensing signal into a motor driving signal for controlling the end effector 108 of the robot arm 101 to move towards a target position. Moreover, the motion parameters (amount of displacement and/or amount of rotation) of the motor driving signal can be determined according to the translation signal or the rotation signal generated on single-touch point P, a set of touch points P, or a combination thereof. The motion parameters are used to control the joint motors 102, the forearm 103 and the rear arm 104 of the robot arm 101 to move horizontally, vertically, forward, backward, upward or downward or rotate.

Refer to FIG. 2. The pressure sensing module 110 is disposed on the operating portion 105 of a robot arm 101. In an embodiment, the operating portion 105 can be disposed on the foremost terminal of the forearm 103 of the robot arm 101, and has a grip portion 106 for the operator to grip with, a stand 107 for placing the machine tool 109, and an end effector 108 for disposing the pressure sensing module 110. In another embodiment, the pressure sensing module 110 can be disposed on any location that is easy to be touched, such as the outer surface of the forearm 103 or the outer surface of the rear arm 104, and the disclosure does not have particular restrictions regarding the location of the pressure sensing module 110.

Refer to FIG. 3A. The touch-sensing surface 112 can be realized by a curved surface, and the end effector 108 for placing the pressure sensing module 110 can be realized by a cylinder 108a. The touch-sensing surface 112 is located on the circumferential surface of the cylinder 108a to form a 3D polar coordinate system using the center of the cylinder 108a as the reference point, the radius of the cylinder 108a as the distance, and the Z-axis as the axial length. The 3D polar coordinate system is used to define the coordinate of any touch point P on the touch-sensing surface 112. In an embodiment, the touch-sensing surface 112 can cover the end effector 108 completely or partially; or, the touch-sensing surface 112 can be divided into several independent sensing regions. The independent sensing regions are attached at different azimuths and surround the peripheral surface of the end effector 108 to form an annular sensing region or other shape, and the disclosure does not have particular restrictions regarding the shape of the touch-sensing surface 112.

Figure 3B:
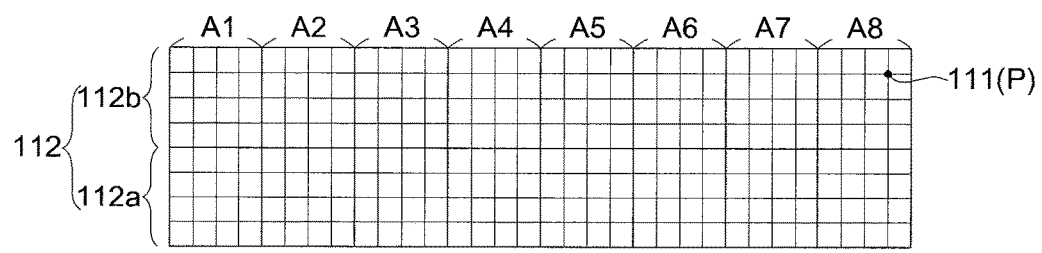

Refer to FIG. 3B. In an embodiment, after the touch-sensing surface 112 is expanded, the touch-sensing surface 112 can further be divided into a first touch-sensing region 112a and a second touch-sensing region 112b according to the operating mode. The first touch-sensing region 112a can be divided into multiple sensing regions A1-A8, such as 4-12 or more, and the number of sensing regions is exemplified by 8 in the present embodiment. The second touch-sensing region 112b can be divided into multiple sensing regions A1-A8, such as 4-12 or more, and the number of sensing regions is exemplified by 8 in the present embodiment. The sensing regions A1-A8 are located at different azimuths of the cylinder 108a (such as top, bottom, left, right, top left, top right, bottom left, and bottom right) to define the coordinate of the circumferential surface of the cylinder 108a, and therefore the azimuths and coordinate of the force applied to the sensing regions A1-A8 can be sensed and calculated.

The first touch-sensing region 112a is for defining a first reference coordinate system satisfying a translational motion mode. That is, when detecting an operation command applied to the first touch-sensing region 112a, the control module 130 controls the end effector 108 of the robot arm 101 to perform a translational motion. Besides, the second touch-sensing region 112b is for defining a second reference coordinate system satisfying a rotational motion mode. That is, when an operation command applied to the second annular touch-sensing region 112b is detected, the control module 130 controls the end effector 108 of the robot arm 101 to perform a rotational motion.

Figure 4A:
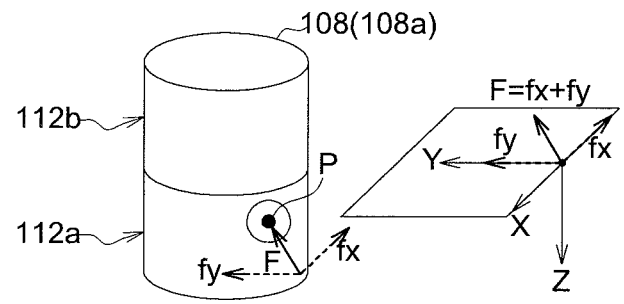
FIGS. 4A-4D are reference diagrams of performing touch operating on an end effector to correspondingly perform a translational motion or a rotational motion.
Figure 4B:
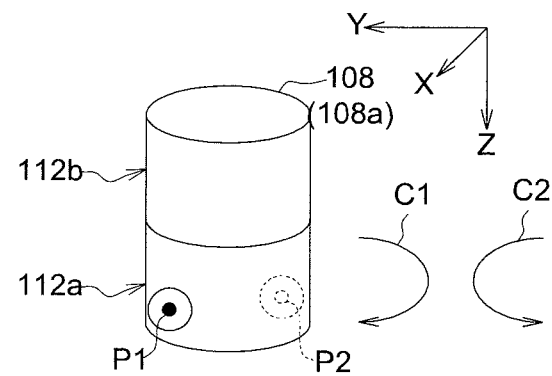

As indicated in FIGS. 4A and 4B, the end effector 108 of the robot arm 101 performs one or two dimension translational motion perpendicular to the axis of the cylinder 108a (that is, the Z-axis) according to the coordinate (or azimuths) of single-touch point P on the first annular touch-sensing region 112a, or the end effector 108 of the robot arm 101 performs a translational motion along the axis of the cylinder 108a (that is, the Z-axis) according to respective drag trace formed by at least two touch points P on the first touch-sensing region 112a. For example, when multiple fingers (such as 2, 3 or 4 fingers) concurrently and continuously press the end effector 108, and translate or rotate in parallel and move from point A to point B to generate multiple drag traces of equal length, the control module 130 controls the end effector 108 to translate along the Z-axis according to a vector of movement or an angle of rotation from point A to point B.

Refer to FIG. 4A. Under the translational motion mode, when an operation command (such as single-touch) applied to the first touch-sensing region 112a is detected by the control module 130, the force F on the touch position has a component fx in the X-axis direction and a component fy in the Y-axis. The end effector 108 performs a translational motion in the X-axis direction according to the component fx in the X-axis direction, and performs a translational motion in the Y-axis according to the component fy in the Y-axis direction, and therefore performs a 2D translational motion. If the component fx in the X-axis direction or the component fy in the Y-axis direction is 0, the end effector 108 can only translate along one coordinate axis.

Refer to FIG. 4B. Under the translational motion mode, when an operation command (such as multi-touch) applied to the first touch-sensing region 112a is detected by the control module 130, the control module 130 controls the end effector 108 to performs a translational motion along the axis of the cylinder 108a (that is, the Z-axis) according to respective drag trace of two touch points P1 and P2 of equal length formed by two fingers concurrently and continuously pressing and rotating on the first annular touch-sensing region 112a. For example, if the fingers move clockwise to generate a drag trace C1, then the control module 130 controls the end effector 108 to translate along the +Z-axis direction. If the fingers move anti-clockwise to generate a drag trace C2, then the control module 130 controls the end effector 108 to translate along the −Z-axis. In the present embodiment, it is exemplified that two fingers concurrently and continuously press the end effector 108. However, the number of fingers is not limited to 2. For example, the operator may concurrent and continuously press on the touch-sensing region with 3 or 4 fingers.

Figure 4C:
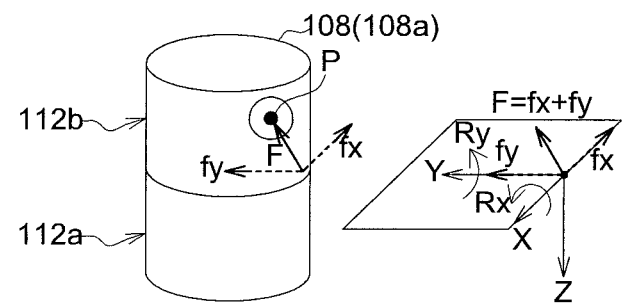
Figure 4D:
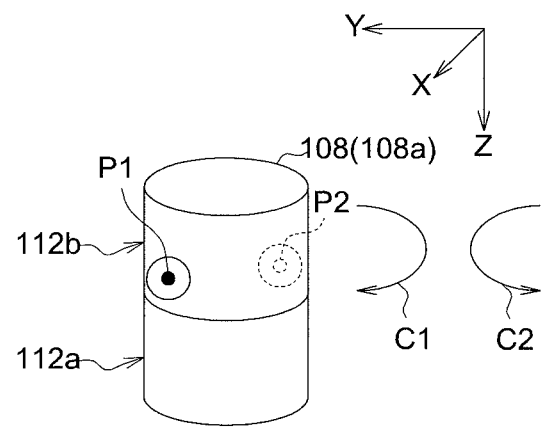

Refer to FIGS. 4C and 4D, the end effector 108 of the robot arm 101 performs a rotational motion rotating around one or two coordinate axis (the X-axis and/or the Y-axis) perpendicular to the axis of the cylinder 108a (that is, the Z-axis) according to the coordinate of a touch point P on the second touch-sensing region 112b, or the end effector 108 of the robot arm 101 performs a rotational motion rotating around the axis of the cylinder 108a (that is, the Z-axis) according to respective drag trace of equal length formed by two touch points P1 and P2 on the second annular touch-sensing region 112b. For example, when multiple fingers (such as 2, 3 or 4 fingers) concurrently and continuously press the end effector 108, and translate or rotate in parallel and move from point A to point B to generate several drag traces of equal length, the control module 130 controls the end effector 108 to rotate along the Z-axis according to a vector of movement or a rotation angle from point A to point B.

Refer to FIG. 4C. Under the rotational motion mode, when an operation command (such as multi-touch) applied to the second touch-sensing region 112b is detected by the control module 130, the force F on the touch coordinate has a component fx in the X-axis direction and a component fy in the Y-axis. The end effector 108 performs a torque Ry rotating around the Y-axis according to the component fx in the X-axis direction and performs a torque Rx rotating around the X-axis direction the according to the component fy in the Y-axis direction, and therefore performs a 2D rotational motion. If the component fx in the X-axis direction or the component fy in the Y-axis direction is 0, then the end effector 108 can only rotate around one coordinate axis.

Refer to FIG. 4D. Under the rotational motion mode, when an operation command (such as multi-touch) applied to the second touch-sensing region 112b is detected by the control module 130, the control module 130 controls the end effector 108 to performs a rotational motion rotating around the axis of the cylinder 108a (that is, the Z-axis) according to respective drag trace of two touch points P1 and P2 of equal length formed by two fingers concurrently and continuously pressing and rotating on the second touch-sensing region 112b. For example, if the fingers move clockwise to generate a drag trace C1, then the control module 130 controls the end effector 108 to rotate along the +Z-axis direction. If the fingers move anti-clockwise to generate a drag trace C2, then the control module 130 controls the end effector 108 to rotate along the −Z-axis. In the present embodiment, it is exemplified that two fingers concurrently and continuously press the end effector 108. However, the number of fingers is not limited to 2. For example, the operator may concurrent and continuously press on the touch-sensing region with 3 or 4 fingers.

Figure 5:
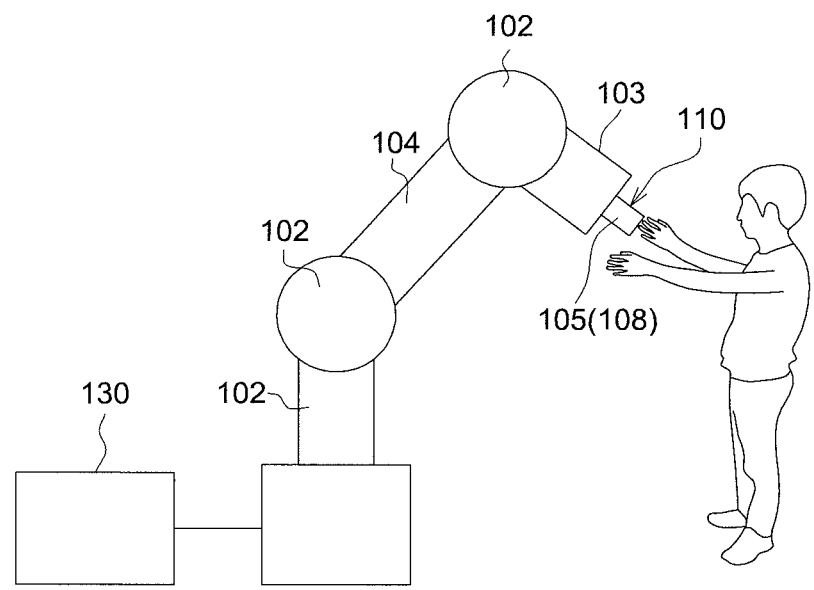
FIG. 5 is a schematic diagram of an operator performing direct teaching on a robot arm.
Figure 6:
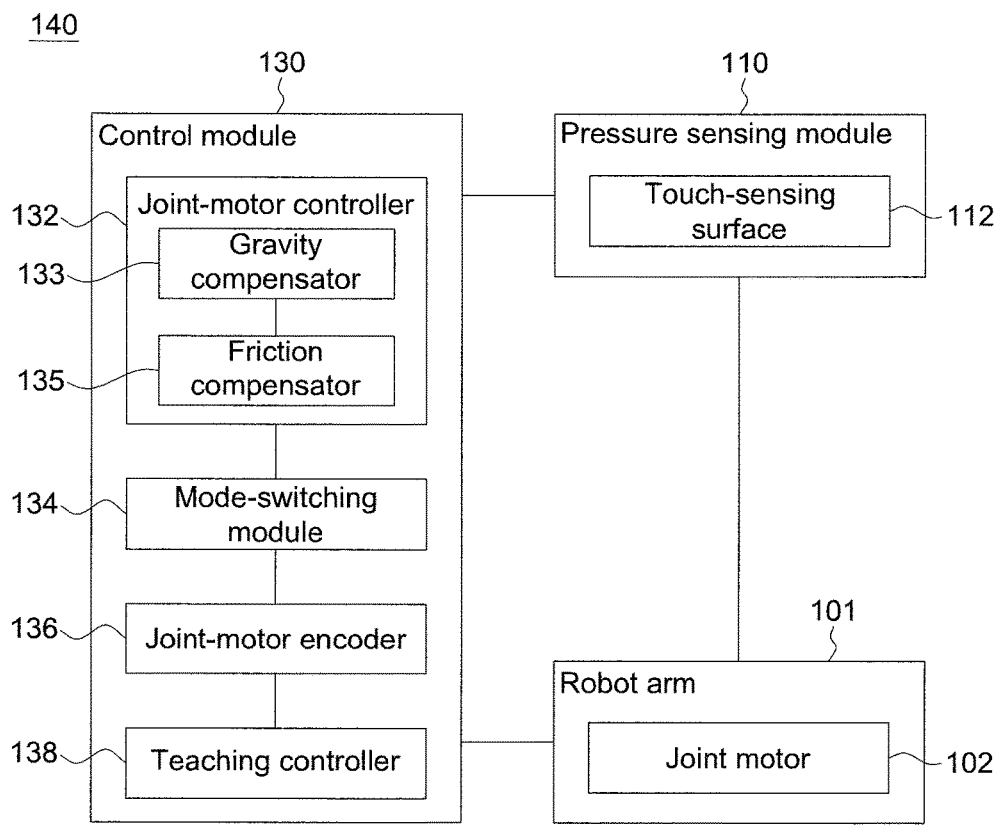
FIG. 6 is a block diagram of a robot arm teaching system according to an embodiment of the disclosure.

Referring to FIGS. 5 and 6, the teaching system 140 of the robot arm 101 according to an embodiment of the disclosure includes a pressure sensing module 110 and a control module 130. The pressure sensing module 110 is disposed on the operating portion 105 of a robot arm 101, and has a touch-sensing surface 112 for detecting an operation command applied to the touch-sensing surface 112. Detailed descriptions of the pressure sensing module 110 can be obtained with reference to above embodiments, and are not repeated here.

Referring to FIG. 6, the control module 130 includes a joint-motor controller 132, a mode-switching module 134, at least a joint-motor encoder 136 and a teaching controller 138. Only one joint-motor encoder 136 is illustrated in FIG. 6 as an example. The mode-switching module 134 is for switching the operating mode of the robot arm 101 to selectively enter a touch operating mode or a compliance teaching mode. Under the touch operating mode, the joint-motor controller 132 generates a set of motor torque signals for moving the robot arm 101 according to an operation command outputted by the pressure sensing module 110 to control the torque of each joint motor 102. Also, under the compliance teaching mode, the joint-motor controller 132 generates a set of joint angle signals according to a compilation command outputted by the joint-motor encoder 136. The touch operating mode is different from the compliance teaching mode in that: under the touch operating mode, the position of the end effector 108 can be precisely controlled through the operation command outputted by the pressure sensing module 110; under the compliance teaching mode, the robot arm 101 can be pulled manually and quickly moved to a predetermined position, that is, the robot arm 101 can be moved to a predetermined position through joint posture control of the robot arm 101. Therefore, the teaching system of the disclosure can directly perform (1) position control on the end effector of the robot arm 101 (referred as precision positioning) under the touch operating mode; or perform (2) joint posture control on the robot arm 101 (referred as rough positioning) under the compliance teaching mode firstly and then perform precise position control on the end effector of the robot arm 101 (for precision positioning teaching) under the touch operating mode subsequently; or perform (3) precise position control on the end effector of the robot arm 101 (for precision positioning teaching) firstly, and then perform joint posture control on the robot arm 101 (for rough positioning teaching) subsequently. The disclosure does not have particular restrictions regarding the order of position control, and therefore resolves the problem encountered by the teaching system when directly performing rough positioning teaching. When the teaching system performs rough positioning teaching directly, the teaching system cannot achieve precise control (precision positioning) of the end effector of the robot arm because the positioning accuracy is poor and motor resistance is too large.

Moreover, the joint-motor encoder 136 is disposed on each joint of the robot arm 101. Under the compliance teaching mode, the joint-motor encoders 136 generate a set of joint angle signals according to the moving trajectory of the robot arm 101 to record the current position and posture of each joint. Furthermore, the teaching controller 138 connects the joint-motor encoders 136, and, under the compliance teaching mode, the teaching controller 138 stores the set of joint angle signals generated by the joint-motor encoders 136. And the teaching controller 138, under the touch operating mode, also can store the motor torque signal of each joint to record the coordinate information of the teaching point (that is, joint posture). When the moving trajectory of the robot arm 101 needs to be reproduced, the teaching controller 138 converts the set of joint angle signals and the motor torque signals into a motor driving signal capable of reproducing the moving trajectory of the robot arm 101.

Refer to FIG. 5. The teaching controller 138 calculates an output command which performing control on the joint motors 102, the forearm 103 or the rear arm 104 according to the touch-sensing signal (single-touch signal or respective drag signal formed by at least two touch points), the angles of the encoders and the coordinate information of the teaching points, which are generated when the operator teaches the robot arm 101. Furthermore, based on the built-in mathematic model and physic parameters (such as reference direction of gravity, the mass, mass-center coefficient of friction of each joint) of the robot arm 101, the operator can teach the robot arm 101 more directly and adjust the degree of positioning accuracy according to actual needs. Meanwhile, during the direct teaching process, the teaching controller 138 stores the coordinate information of the teaching points, which form the moving trajectory of the robot arm 101. Therefore, with the coordinate information of the teaching points, the teaching controller 138 can generate a planned teaching path and drive the robot arm 101, such that the end effector 108 of the robot arm 101 can smoothly pass through the teaching points.

Figure 7:
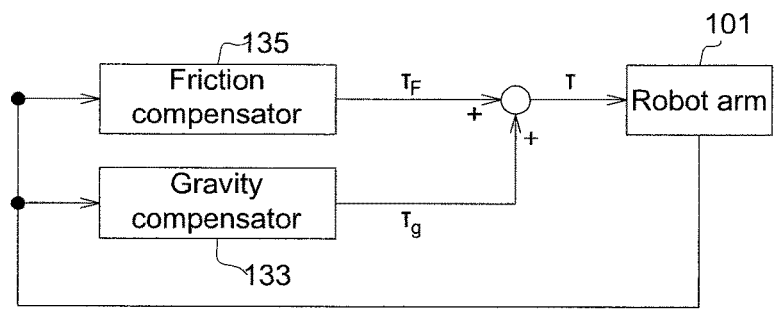
FIG. 7 is a schematic diagram of performing torque compensation on a robot arm.

Refer to FIGS. 6 and 7. The joint-motor controller 132 further includes a gravity compensator 133, which calculates the gravity compensation torque $T_g$ applied to each link of the robot arm according to the angle of each joint of the robot arm 101, the mass and length of each link, and the distances between the mass-center of each link and joint. Additionally, the joint-motor controller 132 further includes a friction compensator 135, which calculates the friction compensation torque $T_F$ applied to each joint according to the rotation speed of each joint of the robot arm 101. Therefore, the control module 110 can correct the torque T outputted by each joint motor 102 of the robot arm 101 according to the gravity compensation torque $T_g$ and the friction compensation torque $T_F$.

Figure 8:
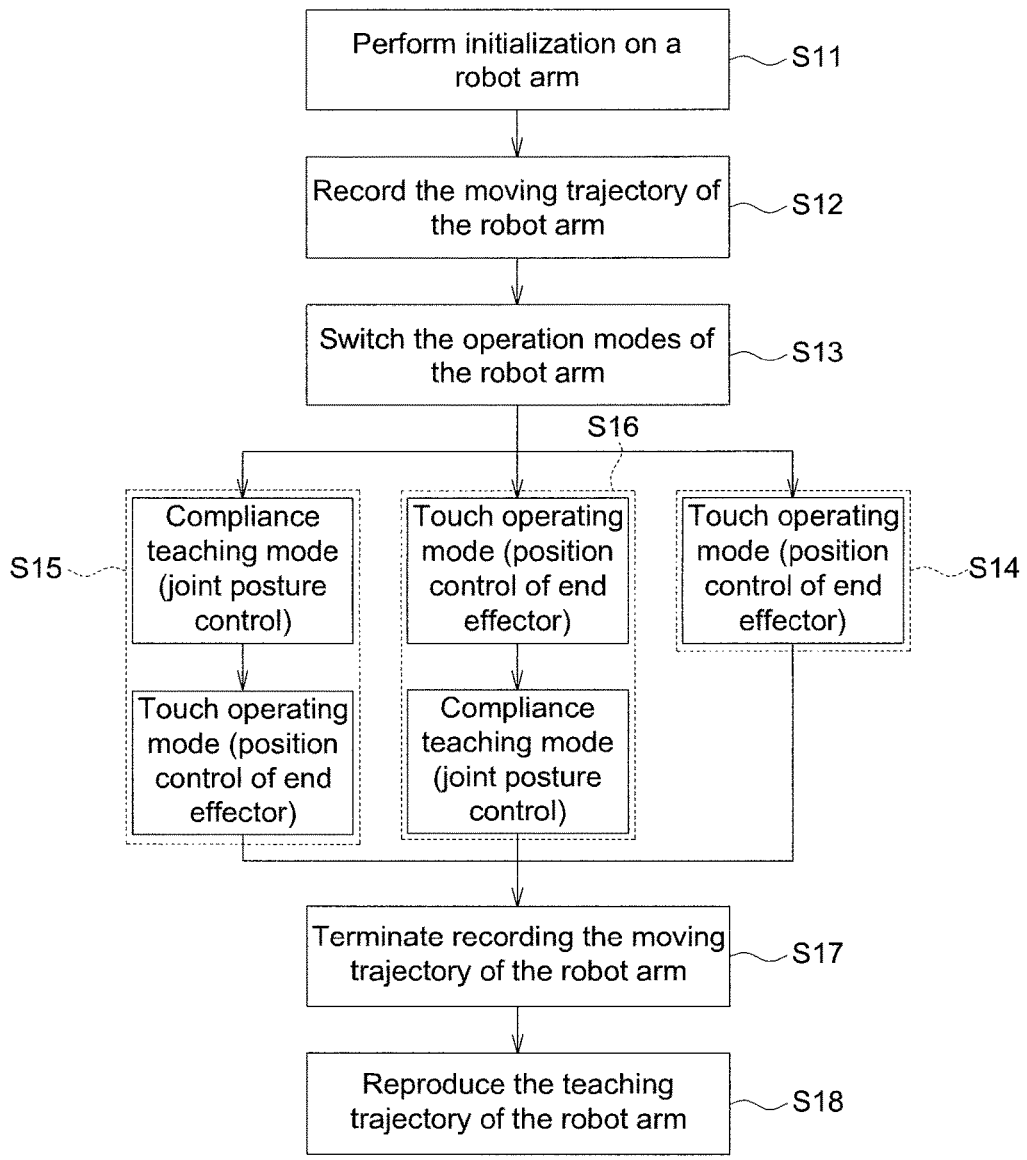
FIG. 8 is a flowchart of a method for performing direct teaching on a robot arm according to an embodiment of the disclosure.

Refer to FIG. 8. The method for performing direct teaching on a robot arm 101 according to an embodiment of the disclosure includes following steps. In step S11, initialization on the robot arm 101 is performed. For example, parameters are set in the control module 130, such as the inertial matrix, gravity torque, coefficient of friction, and reference direction of gravity of each joint motor 102, and equations of motion, such as Newton Euler's equation of motion and Lagrangian equation of motion. The control module 130 calculates the current azimuth and posture of the robot arm 101, that is, the initialized position and posture of the robot arm 101 according to the inertial matrix or gravity torque outputted by each joint motor 102. In step S12, the moving trajectory of the robot arm 101 is recorded, and the end effector 108 of the robot arm 101 is driven to a target position. Meanwhile, the control module 130 sets the operation range and operation mode of the robot arm 101 according to the equations of motion, and outputs a motor driving signal to the robot arm 101 according to the operating mode of the robot arm 101. Additionally, the control module 130 determines whether the moving trajectory of the robot arm 101 remains on a predetermined movement path or deviates from the target position. If it is determined that the robot arm 101 deviates from the target position, then the method proceeds to the following steps. In step S13, if the operator decides to perform direct teaching on the robot arm 101, then the operator switches the operating mode of the robot arm 101 to one of the three operating modes. Under the first operating mode (step S14), the robot arm 101 is controlled through an operation command from the pressure sensing module 110 to correct the moving trajectory of the robot arm 101 by performing position control on the end effector (for precision positioning teaching) directly. Under the second operating mode (step S15), the robot arm 101 is moved to a predetermined position manually, that is, the moving trajectory of the robot arm 101 is corrected by performing joint posture control on the robot arm 101 (for rough positioning teaching) firstly, and then performing position control on the end effector of the robot arm 101 through touch operation (for precision positioning teaching) subsequently. Under the third operating mode (step 16), the moving trajectory of the robot arm 101 is corrected by performing position control on the end effector of the robot arm 101 (for precision positioning teaching) firstly and then performing joint posture control manually (for rough positioning teaching) subsequently. In step S17, after the above teaching process is completed, the recording of the moving trajectory of the robot arm 101 terminates. Meanwhile, the teaching controller 138 stores the touch sensing signals, the angles of the joint-motor encoders 136 and the coordinate information of the teaching points, which are generated when the operator teaches the robot arm 101. In step S18, when the teaching trajectory of the robot arm 101 needs to be reproduced, the teaching controller 138 converts the stored signals into the motor driving signals capable of reproducing the moving trajectory of the robot arm 101 to drive the robot arm 101 to the target position.

It can be understood from above descriptions that the operator can give an operation command to the robot arm 101 through the pressure sensing module 110, and use the control module 130 to convert the touch sensing signal into the torque required at each joint of the robot arm 101 or compensate the torque (the gravity compensation torque or the friction compensation torque) so that the control module 130 can control the azimuth and posture of each joint and realize the collaboration between man and the robot arm 101 in the industrial applications. Moreover, the teaching system and teaching method of the disclosure combine the pressure sensing module 110 and the joint-motor encoder 136 to perform the precision positioning teaching and/or the rough positioning teaching, so that the operator can flexibly adjust the compliance mode of the robot arm 101 and resolve the problems of positioning accuracy being insufficient and motor resistance being too large when the teaching system performs direct teaching.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A control device of a robot arm, comprising:
   a pressure sensing module disposed on an operating portion of a robot arm and having a touch-sensing surface for detecting an operation command applied to the touch-sensing surface, wherein the touch-sensing surface comprises a first touch-sensing region and a second touch-sensing region, the first touch-sensing region is for defining a first reference coordinate system related to a translational motion mode, and the second touch-sensing region is for defining a second reference coordinate system related to a rotational motion mode; and
   a control module configured to receive at least a pressure sensing signal outputted by the pressure sensing module and to output a motor driving signal to the robot arm in response to the operation command, wherein the control module controls the robot arm to move towards a target position according to the operation command.

2. The control device according to claim 1, wherein the pressure sensing module comprises a plurality of pressure sensing elements interconnected and arranged in a form of an array, each pressure sensing element has an upper electrode layer, a pressure sensing layer and a lower electrode layer, and the pressure sensing layer is interposed between the upper electrode layer and the lower electrode layer.

3. The control device according to claim 1, wherein the touch-sensing surface is a curved surface, and located on the end effector of the robot arm.

4. The control device according to claim 3, wherein the end effector is a cylinder with an axis, the first touch-sensing region and the second touch-sensing region both surround the circumferential surface of the cylinder.

5. The control device according to claim 4, wherein the robot arm performs one-dimensional (1D) or two-dimensional (2D) translational motion perpendicular to the axis of the end effector according to a single-touch point on the first touch-sensing region, or performs a translational motion along the axis of the end effector according to trajectories formed by at least two touch points on the first touch-sensing region.

6. The control device according to claim 4, wherein the robot arm performs a rotational motion rotating about the axis perpendicular to the axis of the end effector according to a single-touch point on the second touch-sensing region, or performs a rotational motion rotating about the axis of the end effector according to trajectories formed by at least two touch points on the second touch-sensing region.

7. The control device according to claim 1, wherein the control module comprises a joint-motor controller and a mode-switching module, the mode-switching module is for switching operating modes of the robot arm, the operating modes of the robot arm comprise a compliance teaching mode and a touch operating mode, under the touch operating mode, the joint-motor controller generates a set of motor torque signals for moving the robot arm according to the operation command.

8. The control device according to claim 7, wherein the control module comprises at least a joint-motor encoder disposed on a joint of the robot arm, and the joint-motor encoder generates a set of joint angle and torque signals according to the moving trajectory of the robot arm under the compliance teaching mode.

9. The control device according to claim 8, wherein the control module comprises a teaching controller, and the teaching controller stores the set of joint angle and torque signals generated by the joint-motor encoder under the compliance teaching mode and converts those signals into the motor driving signal to reproduce the moving trajectory of the robot arm.

10. The control device according to claim 7, wherein the joint-motor controller further comprises a gravity compensator, the gravity compensator calculates a gravity compensation torque applied to each link according to an angle of each joint, the mass and length of each link, and the distances between the mass-center of each link and joint.

11. The control device according to claim 7, wherein the joint-motor controller further comprises a friction compensator, the friction compensator calculates a friction compensation torque applied to each joint according to a rotation speed of each joint of the robot arm.

12. A robot arm teaching system, comprising:
    a pressure sensing module disposed on an operating portion of a robot arm and having a touch-sensing surface for detecting an operation command applied to the touch-sensing surface, wherein the touch-sensing surface comprises a first touch-sensing region and a second touch-sensing region, the first touch-sensing region is for defining a first reference coordinate system related to a translational motion mode, and the second touch-sensing region is for defining a second reference coordinate system related to a rotational motion mode; and a control module configured to receive at least a pressure sensing signal outputted by the pressure sensing module and to output a motor driving signal to the robot arm in response to the operation command, wherein the control module comprises:

a joint-motor controller for generating a set of motor torque signals for moving the robot arm according to the operation command;

a mode-switching module for switching operating modes of the robot arm, wherein the operating modes of the robot arm comprise a compliance teaching mode and a touch operating mode; and a plurality of joint-motor encoders disposed on each joint of the robot arm, wherein the joint-motor encoders generate a set of joint angle signals according to a moving trajectory of the robot arm under the compliance teaching mode;

wherein, the control module controls the robot arm to move towards a target position according to the operation command.

13. The teaching system according to claim 12, wherein the pressure sensing module comprises a plurality of pressure sensing elements interconnected and arranged in a form of an array, each pressure sensing element has an upper electrode layer, a pressure sensing layer and a lower electrode layer, and the pressure sensing layer is interposed between the upper electrode layer and the lower electrode layer.

14. The teaching system according to claim 12, wherein the touch-sensing surface is a curved surface, and located on the end effector of the robot arm.

15. The teaching system according to claim 14, wherein the end effector is a cylinder with an axis, and the first touch-sensing region and the second touch-sensing region both surround a circumferential surface of the cylinder.

16. The teaching system according to claim 15, wherein the robot arm performs 1D or 2D translational motion perpendicular to the axis of the end effector according to a single-touch point on the first touch-sensing region, or performs a translational motion along the axis of the end effector according to trajectories formed by at least two touch points on the first touch-sensing region.

17. The teaching system according to claim 15, wherein the robot arm performs a rotational motion rotating about the axis perpendicular to the axis of the end effector according to a single-touch point on the second touch-sensing region, or performs a rotational motion rotating about the axis of the end effector according to trajectories formed by at least two touch points on the second touch-sensing region.

18. The teaching system according to claim 14, wherein the control module further comprises a teaching controller, the teaching controller stores a set of joint angle and torque signals generated by the joint-motor encoders under the compliance teaching mode and converts the set of joint angle and torque signals into the motor driving signal to reproduce the moving trajectory of the robot arm.

19. The teaching system according to claim 14, wherein the joint-motor controller further comprises a gravity compensator, the gravity compensator calculates a gravity compensation torque applied to each link of the robot arm according to an angle of each joint, the mass and length of each link, and the distances between the mass-center of each link and joint.

20. The teaching system according to claim 14, wherein the joint-motor controller further comprises a friction compensator, the friction compensator calculates a friction compensation torque applied to each joint according to a rotation speed of each joint of the robot arm.

21. A method for performing direct teaching on a robot arm, comprising:

performing initialization on a robot arm and outputting a motor driving signal to the robot arm;

recording a moving trajectory of the robot arm to obtain a current azimuth and posture of the robot arm;

switching operating modes of the robot arm when the moving trajectory of the robot arm deviates from a target position, wherein the operating modes comprise a compliance teaching mode and a touch operating mode, wherein under the touch operating mode, a position control on an end effector of the robot arm is performed on the robot arm according to an operation command from a pressure sensing module;

performing a joint posture control on the robot arm manually under the compliance teaching mode;

correcting the moving trajectory of the robot arm by performing the position control on the end effector of the robot arm, or performing the position control on the end effector of the robot arm firstly and the joint posture control subsequently, or performing the joint posture control on the robot arm firstly and the position control on the end effector subsequently;

terminating recording the moving trajectory of the robot arm; and reproducing a teaching trajectory of the robot arm to move the robot arm to the target position.

* * * * *